United States Patent [19]

Oberg

[11] Patent Number: 5,270,690
[45] Date of Patent: Dec. 14, 1993

[54] BIDIMENSIONAL INPUT CONTROL SYSTEM

[75] Inventor: Arthur E. Oberg, Anaheim, Calif.

[73] Assignee: Harold C. Avila, Riverside, Calif.

[21] Appl. No.: 614,362

[22] Filed: Nov. 16, 1990

Related U.S. Application Data

[63] Continuation of Ser. No. 348,916, May 8, 1989, abandoned.

[51] Int. Cl.⁵ .............................................. G09G 3/02
[52] U.S. Cl. ............................. 345/163; 74/471 XY; 345/184
[58] Field of Search ............... 340/706, 709, 710; 74/471 XY, 471 R, 504, 89.22; 338/29, 31, 74, 79, 157, 160; 200/567, 252, 260, 38 CA

[56] References Cited

U.S. PATENT DOCUMENTS

| | | | |
|---|---|---|---|
| 3,643,148 | 2/1972 | Brown et al. | 74/471 XY |
| 4,369,439 | 1/1983 | Broos | 340/706 |
| 4,692,756 | 9/1987 | Clark | 340/706 |
| 4,712,101 | 12/1987 | Culver | 74/471 |
| 4,724,715 | 2/1988 | Culver | 74/471 R |
| 4,799,049 | 1/1989 | Avila | 340/710 |
| 4,823,634 | 4/1989 | Culver | 340/706 |
| 4,928,093 | 5/1990 | Rahman | 74/471 XY |

FOREIGN PATENT DOCUMENTS

5586428 1/1982 Japan.
2076602 5/1981 United Kingdom.

*Primary Examiner*—Alvin E. Oberley
*Assistant Examiner*—Amare Mengistu
*Attorney, Agent, or Firm*—Morland C. Fischer

[57] ABSTRACT

A manually activated bidimensional, boundaryless input control system having particular application to a computer to enable the computer operator to selectively ana accurately control the positioning of a video image (e.g. a cursor) on a computer monitor. The input system comprises a contact bar which is located near the front of the computer keyboard so as to be readily accessible to the computer operator for rotation around a fixed axis. The contact bar carries a plurality of evenly spaced, longitudinally extending belts which may be rotated by the computer operator in a longitudinal direction around the bar. Movement sensing devices are interfaced with and responsive to both the rotation of the bar and at least one of the belts extending longitudinally therealong. The movement sensing devices are connected with electronic signal generators which are adapted to provide output signals to the computer for controlling the movement of the cursor up or down and left or right corresponding to the movements of the rotatable bar and the belts carried thereby.

27 Claims, 8 Drawing Sheets

BIDIMENSIONAL INPUT CONTROL SYSTEM

This patent application is a continuation of patent application Ser. No. 348,916 filed May. 8, 1989 is now abandoned.

BACKGROUND OF THE INVENTION

1. Field of the Invention

This invention relates to a manually activated, bidimensional, boundaryless input control system for a computer which is located near the front of the computer keyboard to be accessible to and rotated by the computer operator in one or both of two orthogonally aligned axes of a bidimensional operating field for selectively and accurately controlling the movement and positioning of a video image (e.g. a cursor) over the computer monitor.

2. Background Art

In several computer controlled devices, such as, for example, a computer typewriter, a personal computer, a computer aided drawing machine, and the like, a video image or cursor is moved up and down or sideways over an associated monitor. A typical way of moving the cursor along the monitor is by means of a conventional mouse. The mouse has a spherical ball which rotates when the operator moves the mouse. The cursor is moved along the monitor in a direction and over a distance that corresponds to the direction of rotation and the number of turns completed by the spherical ball of the mouse. Since the mouse provides no precise up, down, left or right senses of direction, use of the mouse, may be, in some cases, difficult and time-consuming, especially in situations where both speed and accurate position control of the cursor are desired.

What is more, the mouse is usually positioned at a remote location from the computer by way of an electrical wire or cable. Thus, the operator of a computer device must remove his hands from an associated keyboard and his eyes from the monitor in order to visually locate and manually operate the mouse. These steps interrupt the computing process, introduce wasteful delay, and interfere with the operator's concentration, particularly when the mouse must be frequently accessed. What is still more, the conventional mouse typically consumes a relatively large amount of space peripheral to the computing device. Hence, use of a mouse may not be practical in those situations where it is preferable to avoid space consuming peripheral devices or where a work space may have little additional room for a mouse, without subjecting the operator to both inconvenience and inefficiency.

The present bidimensional input control system is a boundaryless control system that overcomes the aforementioned problems and inefficiencies associated therewith by replacing the space consuming and remotely located mouse with a highly accurate, easily accessible, and space conserving device which avoids the loss of concentration and the need for the operator to remove his hands and eyes from the keyboard when positioning a cursor on a monitor. The present system has an operational improvement over prior systems, because it is not limited by boundary restrictions in either axis of a bidimensional field, which is a main limitation of such prior systems.

Examples of a system which may be interfaced with a computer to position a cursor on a video monitor are available by referring to one or more of the following U.S. Pat. Nos.:

4,712,101 Dec. 8, 1987
4,724,715 Dec. 16, 1988
4,799,049 Jan. 28, 1989

SUMMARY OF THE INVENTION

In general terms, a bidimensional, boundaryless input control system is disclosed to be associated with a computer device, such as a personal computer, or the like, to enable the computer operator to selectively and accurately control the position of a video image (e.g. a cursor) over an associated monitor. The system comprises an elongated (e.g. cylindrical) contact bar that is located near the front of and across the computer keyboard so as to be readily accessible to the computer operator without requiring the removal of the operator's band from the keyboard and eyes form the monitor, as may otherwise be required if a conventional, remotely located mouse were to be used to control the position of the cursor.

The contact bar is supported at the keyboard for rotation by the computer operator around a fixed axis and through a first plane. The bar carries a plurality of longitudinally extending belts which are evenly spaced and rotatable in a longitudinal direction around the bar. Each of the belts crosses the opposite ends of the bar at a different position so as to be able to loop completely around the bar without intersecting the paths of the other belts. The belts are slidable by the computer operator axially along the bar through a second plane, which second plane is orthogonally aligned with the first plane through which said bar may be rotated.

The input system of the present invention also comprises at least two movement sensing devices. Each of the movement sensing devices includes a rotatable wheel coupled to a rotation sensor via a connecting rod. The wheel of the first sensing device is located at the interior of the keyboard to be interfaced with and rotated by the contact bar, and the wheel of the second sensing device is located at the interior of the keyboard to be interfaced with and rotated by one or more of the belts that are carried by and rotated around the bar. The rotation sensors of the movement sensing devices are interfaced with respective signal generators that are adapted to generate output electrical signals which are indicative of both the rotational distance and direction travelled by the contact bar relative to the keyboard and the belts relative to the bar. Such output signals are supplied from the signal generators to the computer for controlling movements of the cursor up or down and left or right corresponding to the movements of the bar and the belts by the computer operator.

DESCRIPTION OF THE PREFERRED EMBODIMENT

Figure 1:
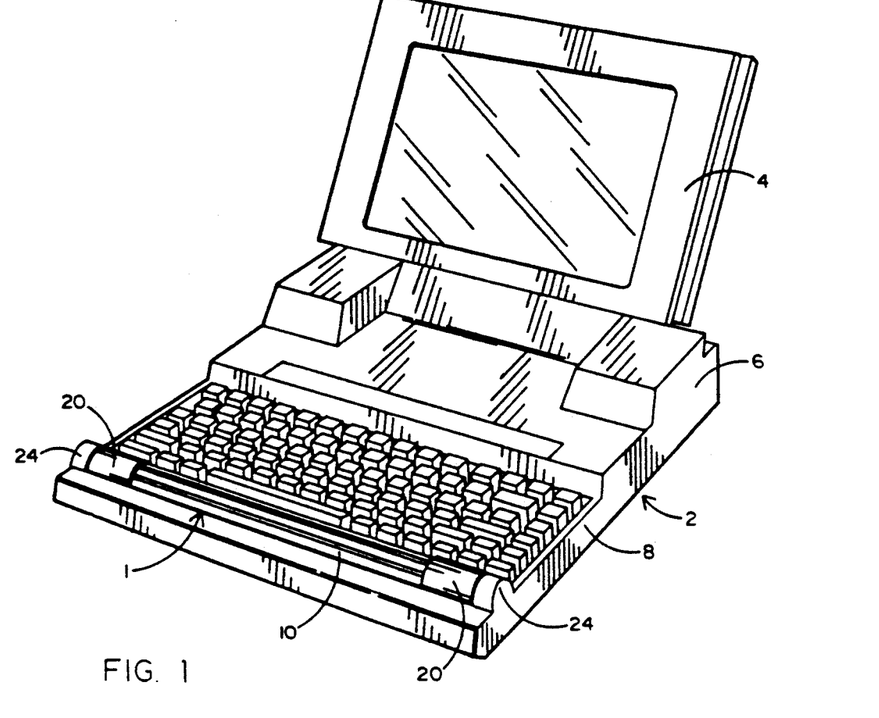
FIG. 1 is illustrative of a computer of the type to which the present bidimensional, boundaryless input control system is applicable.

The bidimensional, boundaryless input control system 1 which forms the present invention, by which the position of a video image (e.g. a cursor) may be selectively and accurately moved around the monitor of a computer, is described while referring to the drawings, where FIG. 1 is illustrative of a portable (e.g. laptop) personal computer 2. Although the computer 2 illustrated in FIG. 1 is of the portable and laptop types, this is not to be regarded as a limitation of the present invention, and it is to be expressly understood that the input system 1 may be associated with other computer devices, especially those that have heretofor controlled the movements of a video image by means of a peripheral device such as a mouse, track ball, light pen, etc.

The computer 2 has the conventional components, including a monitor 4, a housing 6 in which the computer software and hardware functions are controlled, and a keyboard 8. The bidimensional, boundaryless input control system 1 of the present invention, which translates direction sensitive, computer operator generated input signals into corresponding movements of the cursor on the monitor 4 is preferably located near the front of and across the computer keyboard 8 so as to be readily and conveniently accessible to the computer operator. Of course, it would also be within the scope of this invention to locate input system 1 at some other part (e.g. the back) of the keyboard.

Figure 2:
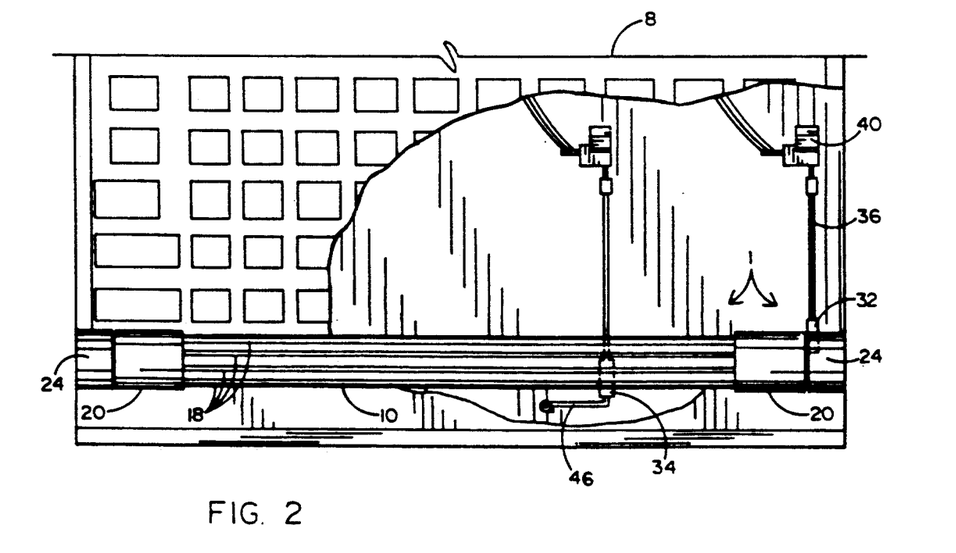
FIG. 2 is a top, partially broken away view of the computer of FIG. 1 showing the details of the input system which forms the present invention.
Figures 4, 5:
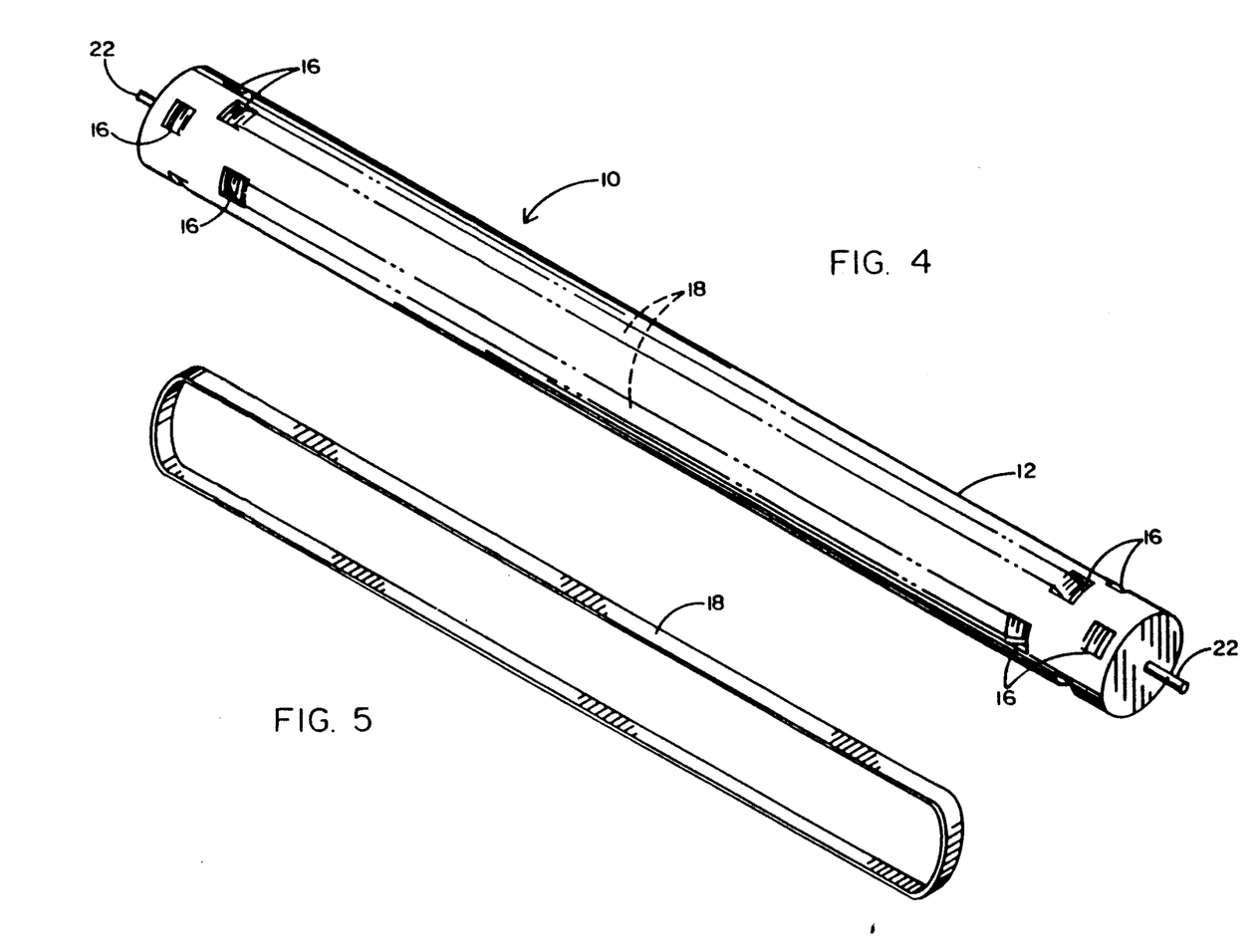
FIG. 4 illustrates a cylindrical contact bar which forms the input system of FIG. 3.
FIG. 5 illustrates a belt which is to be carried by the contact bar of FIG. 4.

More particularly, and referring concurrently to FIGS. 1 and 2 of the drawings, input control system 1 comprises an elongated contact bar 10 having a generally hollow, cylindrical core 12. However, it is to be understood that the contact bar 10 may have other shapes, including, but not limited to, the shapes illustrated in FIGS. 17 and 18. Referring briefly to FIGS. 4-8 of the drawings (and as is best shown in FIG. 4), a staggered array of slots or openings 16 is formed in the core 12 of bar 10 through which to receive a plurality of rotatable belts or bands 18. As is best illustrated in FIG. 5, each belt 18 is a closed, generally oblong-shaped force responsive member that is formed from a relatively non-extensible material. A set of four slots 16 is formed through the core 12 for receipt of each belt 18 that is to be carried for rotation along bar 10. By way of example only, the bar 10 which is illustrated herein carries a total of four parallel aligned and longitudinally extending belts 18 that are uniformly spaced from one another around the periphery of the core 12. Therefore, a total of sixteen slots 16 is formed through core 12, with eight of said slots being formed at each end thereof. The slots 16 are particularly aligned with one another to permit the belts 18 to loop around and be displaced in a direction corresponding to the longitudinal core axis of bar 10. Moreover, the belts 18 are positioned so that a majority of the surface area thereof is, at all times, accessible to the computer operator. Thus, each belt 18 runs axially along the outside of the core 12 and then through the ends thereof via a pair of parallel aligned slots 16 located at opposite sides of each end.

Figures 6, 7, 8:
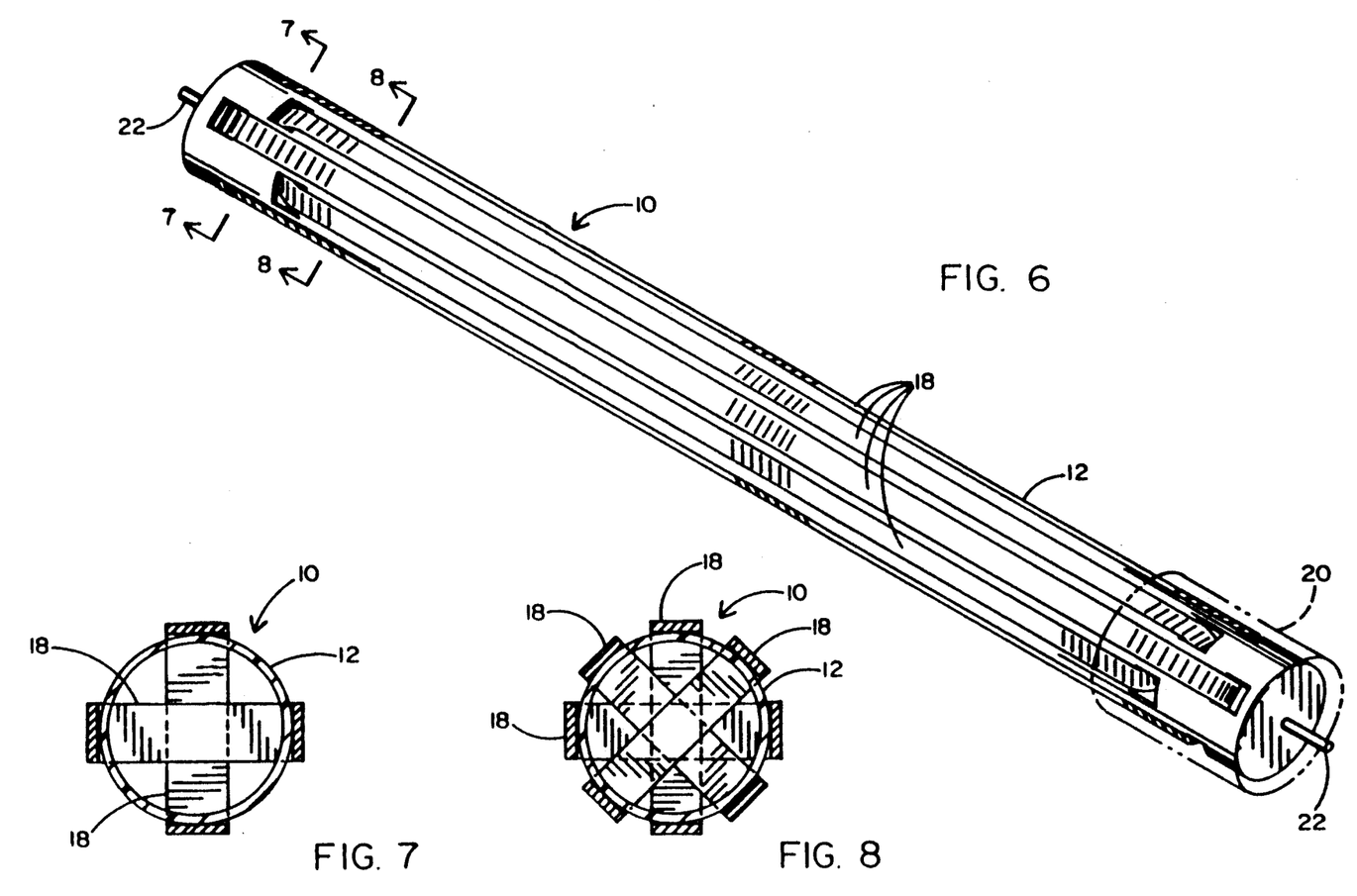
FIG. 6 illustrates the contact bar of FIG. 4 carrying a plurality of the belts of FIG. 5.
FIG. 7 is a cross-section taken along lines 7—7 of FIG. 6.
FIG. 8 is a cross-section taken along lines 8—8 of FIG. 6.

It is preferable that the belts 18 pass through each end of the core 12 of bar 10 at a different position. Therefore, each of said belts 18 can be freely rotated in an axial or longitudinal direction around core 12 independently of the other belts. Moreover, all four of the belts 18 may be efficiently carried and displaced (i.e. rotated) around the core 12 through non-intersecting rotational paths., As is best represented in FIG. 6, each end of the bar 10 is received within an end cap 20. The end caps 20 surround the slots 16 at the opposite ends of bar 10 through which the belts 18 pass when looping around said bar, whereby to prevent manual access to said slots. A pin 22 projects outwardly and oppositely from each end cap 22 so as to form a shaft by which the bar 10 may rotate. Alternatively, the opposite ends of bar 10 may be closed, and the pins 22 may project outwardly from said closed ends and through end caps 20 to support bar 10 for rotation.

Referring once again to FIGS. 1 and 2, the input system 1 is shown in the assembled relationship with the keyboard 8 of computer 2, such that the contact bar 10 is supported for rotation thereat. The computer keyboard 8 may include a pair of coextensively formed, parallel aligned hubs 24 which project upwardly from opposite sides of said keyboard. The hubs 24 have receptacles (not shown) which are sized and aligned to receive the pins (designated 22 in FIGS. 4 and 6) that project outwardly and oppositely from the ends of bar 10 so as to form a shaft. In this manner, the bar 10 of input system 1 can be supported for rotation relative to the keyboard 8 for an important purpose, the details of which will now be explained.

Figure 3:
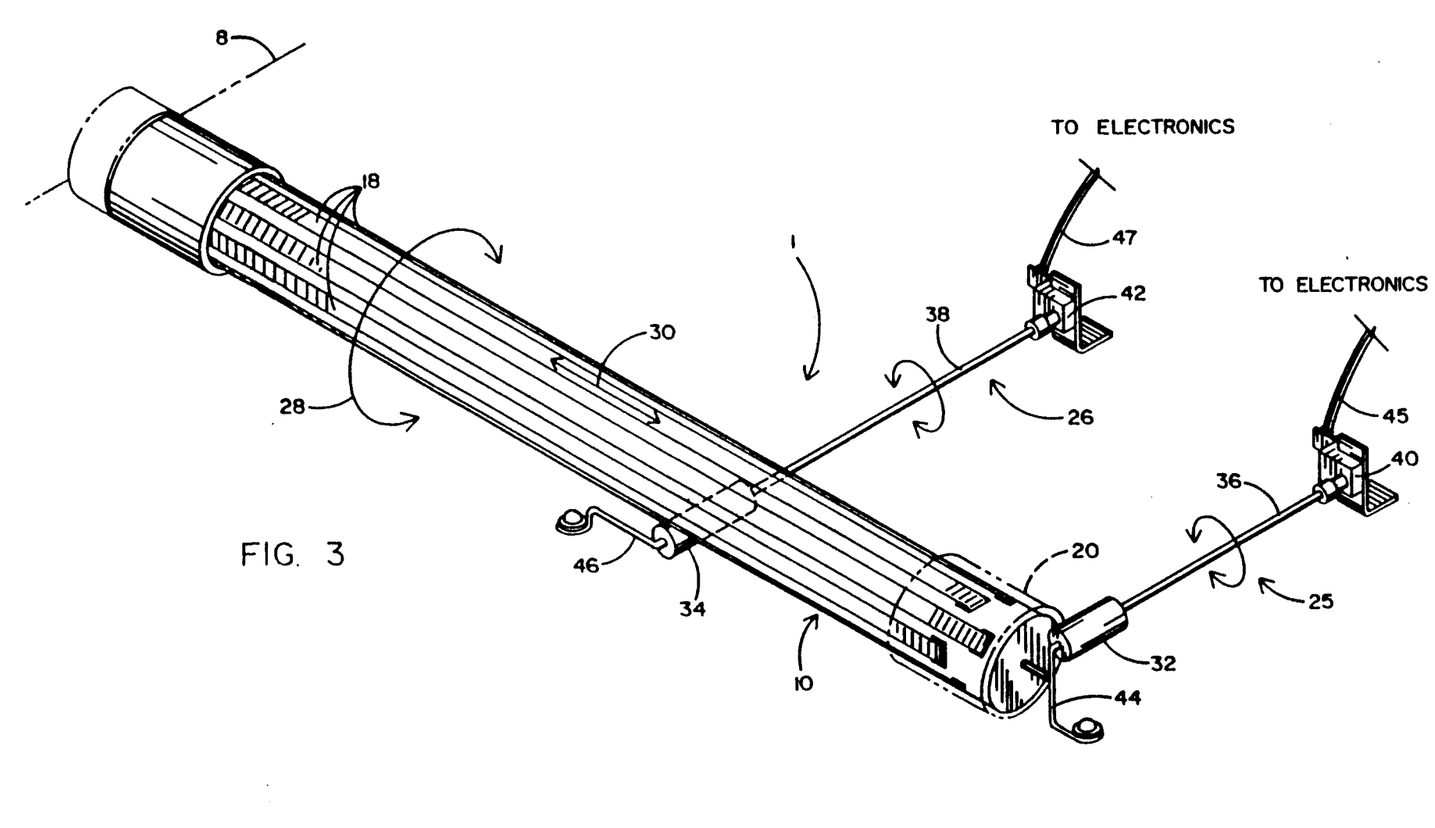
FIG. 3 is an enlarged perspective view of the bidimensional boundaryless input control system of the present invention.
Figure 9:
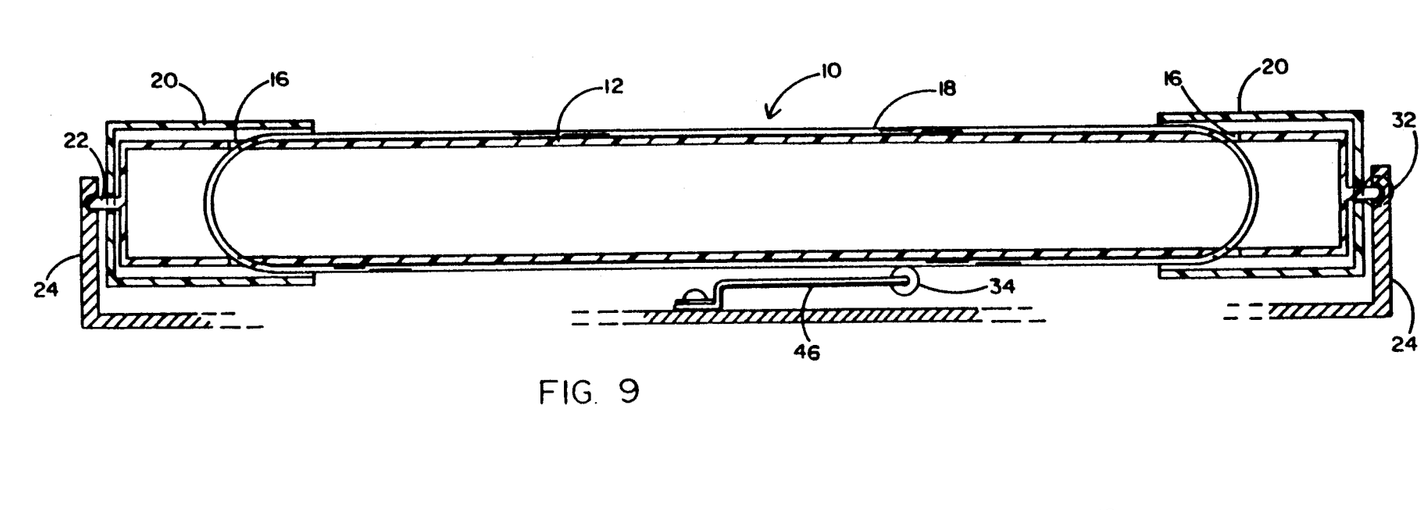
FIG. 9 is a cross-section of the bidimensional boundaryless input control system of the present invention.

Referring concurrently to FIGS. 2, 3 and 9 of the drawings, a pair of rotation sensing devices 25 and 26 are shown interfaced with the contact bar 10 of input system 1. The rotation sensing devices 25 and 26 are particularly located with respect to the bar 10 at the interior of the computer keyboard 8 so as to be responsive to both the rotational movement of bar 10 relative to keyboard 8 (in the direction indicated by the reference arrow 28 of FIG. 3) and the rotational movement of one or more of the belts 18 along the longitudinal axis of and around the bar 10 (in the direction indicated by the reference arrow 30). More particularly, each of the sensing devices 25 and 26 includes a rotating wheel 32 and 34, a rotatable connecting rod 36 and 38, and a rotation sensor 40 and 42. The connecting rods 36 and 38 are coupled between rotating wheels 32 and 34 and rotation sensors 40 and 42, such that a rotation of either wheel 32 or 34 in response to a rotational displacement of the bar 10 or a belt 18 can be converted into a corresponding signal at sensor 40 or 42 by way of the connecting rod 36 or 38.

A first of the rotating wheels 32 is attached to a resilient support arm 44 and spaced above the base of the computer keyboard 8 so as to engage one end of bar 10, such that wheel 32 will be rotated when the computer operator rotates bar 10 around its axis. The wheel 32 is preferably spring biased by support arm 44 to permit backlash in a direction parallel to the bar axis to assure reliable frictional contact between the wheel 32 and the bar 10, it is also preferable that arm 44 prevent backlash in a direction perpendicular to the bar axis. Hence, a rotation of bar 10 by the computer operator in either direction along a first axis of a bidirectional field (as indicated by the reference arrow 28) will cause a rotation of wheel 32 and, therefore, a corresponding rotation of connecting rod 36. Rotation sensor 40 is responsive to both the direction and rotational distance traveled by contact bar 10 (by way of wheel 32 and connecting rod 36). Rotation sensor 40 is interfaced with electronics (via wires 45) which are adapted to generate a corresponding electrical signal to the computer in the same way that a conventional mouse generates an electrical signal which is indicative of the direction and distance traveled by a rotatable ball. Thus, the wheel 32 functions as an encoder and the sensor 40 functions as a decoder by which a rotation of contact bar 10 through the first axis of a bidimensional operating field can be detected and converted into a signal by which to control the vertical (i.e. up or down) movement of a cursor on the monitor of the computer.

The second of the rotating wheels 34 is attached to a resilient spring arm 46 and spaced above the base of keyboard 8 to engage the bar 10 and the bottom surface of at least one of the belts 18 which is rotatable therearound. Therefore, the wheel 34 will be rotated when the computer operator applies an axial force to the exposed top surface of the belt 18 and thereby rotates the belt 18 in a longitudinal direction around bar 10. The wheel 34 is preferably spring biased by support arm 46 to permit backlash in a direction perpendicular to the bar axis to provide reliable frictional contact between the wheel 34 and the bar 10. It is also preferable that the support arm 46 prevent backlash in a direction parallel to the bar axis. Hence, a rotation of the belt 18 by the computer operator in either direction along a second axis of the bidimensional field (as indicated by the reference arrow 30) will cause a rotation of the wheel 34 and, therefore, a corresponding rotation of connecting rod 38. Rotation sensor 42 is responsive to both the direction and rotational distance traveled by the belt 18 (by way of wheel 34 and connecting rod 38). Rotation sensor 42 is interfaced with electronics (via wires 47) which are adapted to generate a corresponding electrical signal to the computer. Thus, wheel 34 functions as an encoder and the sensor 42 functions as a decoder by which the rotation of a belt 18 (the bottom surface of which being in contact with the rotatable wheel 34) along the second axis of the bidimensional operating field can be detected and converted into a signal by which to control the horizontal (i.e. side to side) movement of the cursor across the computer monitor.

Accordingly, it may be appreciated that the contact bar 10 and the longitudinally extending belts 18 which are carried by said bar are rotatable along orthogonally aligned first and second axes of the bidimensional operating field. It may be further appreciated that there are no physical boundary restraints placed on the computer operator for rotating either or both of said contact bar 10 or belts 18 through their respective orthogonally aligned axes. That is to say, the bar 10 may be rotated by the computer operator around its axis through any number of revolutions relative to keyboard 8. Moreover, the belts 18 may be rotated by the computer operator through any number of revolutions longitudinally around bar 10. In this manner, no boundary in either axis (vertical or horizontal) is imposed on the computer operator for moving a cursor, or the like, to any position on the video monitor. Consequently, the resolution of the system may be substantially increased with no boundary problems. For example, it might be desirable that each complete rotation of bar 10 or a belt 18 corresponds to one millimeter of movement of the cursor. Thus, the computer operator may selectively and accurately control the position and movement of the cursor on the monitor with high precision and for fine resolution applications while still having limitless freedom of movement along either axis. Furthermore, it may be appreciated that input control system 1 is an improvement over conventional control systems which are significantly limited by inherent boundary constraints which are imposed thereon.

Figure 10:
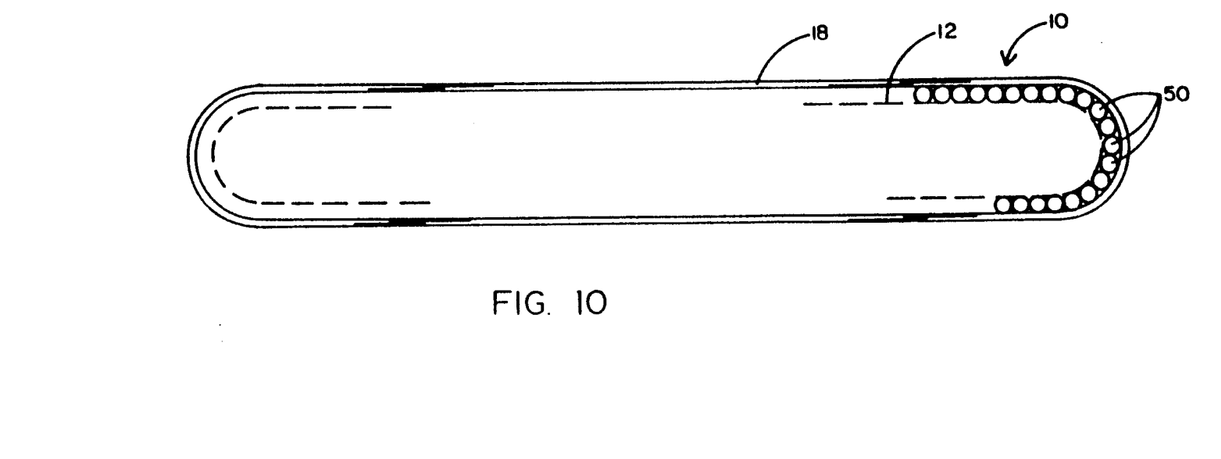
FIGS. 10-16 and 19-20 are illustrative of alternate embodiments of the belts which are carried by the contact bar of the present input system.

FIGS. 10-16 of the drawings show different embodiments for the belts 18 which are carried by the contact bar 10 and rotated therearound by the computer operator for moving a cursor from side to side across the monitor. In FIG. 10, a series of rolling wheels 50 is disposed between each of the belts 18 (only one of which is shown) and the core 12 of contact bar 10. The wheels 50 are cylindrically shaped and have a length corresponding to the width of the belt 18 below which a plurality of such wheels are located. By sliding the belts 18 over the wheels 50, friction can be minimized, and the belts can be rotated around the core 12 with a reduced effort on the part of the computer operator.

Figure 11:
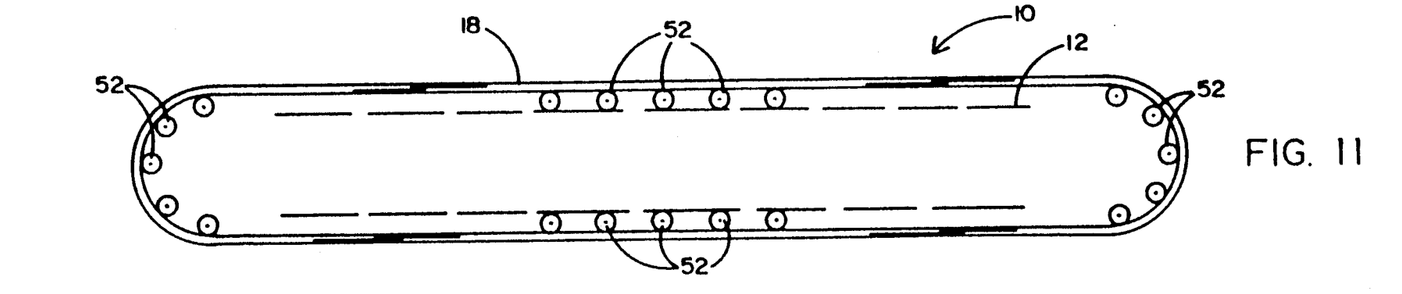
Figure 12:
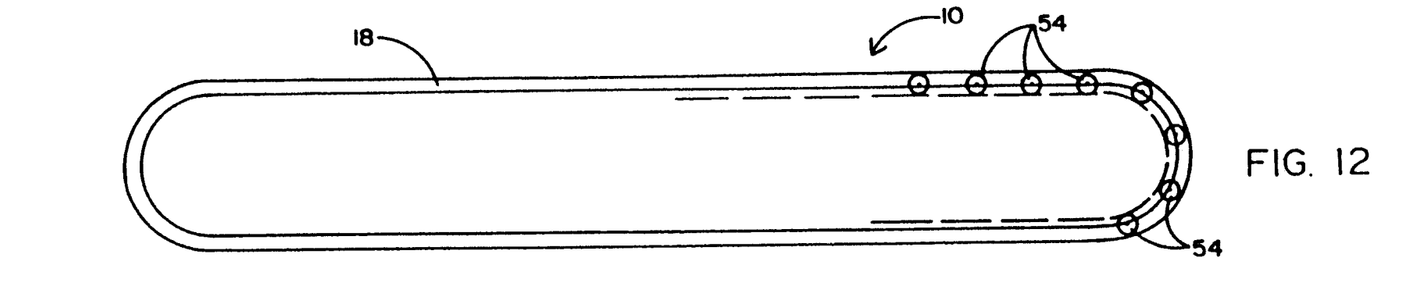

FIG. 11 of the drawings shows a series of wheels 52 which are fixedly attached to the core 12 of the contact bar 10 so that a respective belt 18 (only one of which is shown) can be slidable thereover. The wheels 52 may be located at either or both of the corners and/or at the middle of the bar 10 to reduce friction and the force necessary to cause the belt to slide around the bar. Instead of fixing the wheels at the core 12 of bar 10 (as shown in FIG. 11), a series of wheels 54 is fixedly attached, in FIG. 12, to the bottom surface of each belt 18 so as to reduce friction when the belts 18 slide relative to the bar 10.

Figure 13:
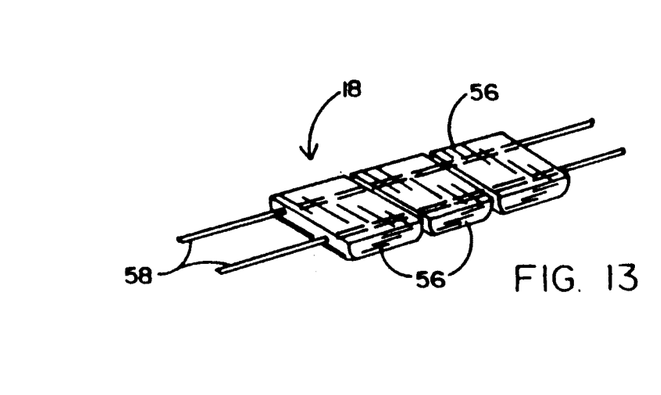
Figure 14:
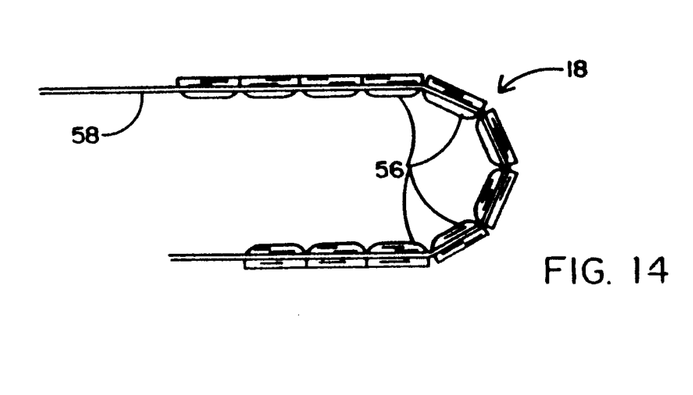

In FIGS. 13 and 14 of the drawings, each belt 18 is formed from a series of pad-like segments or sections 56 which are interlinked with one another by means of a pair of flexible wires 58, or the like, which pass through the interiors of the belt segments 56. It is preferable that the edge of each segment 56 be rounded or beveled. A segmented belt 18, such as that shown in FIGS. 13 and 14, may easily slide around the core of the contact bar.

Figure 15:
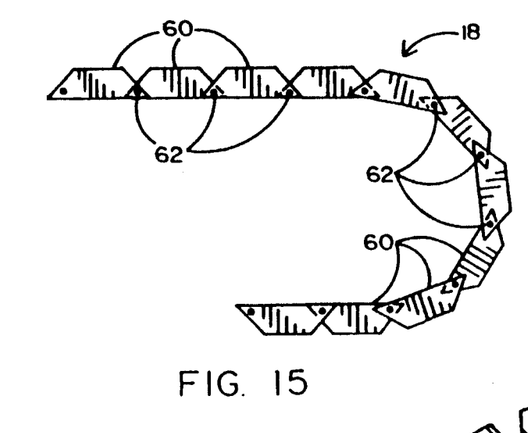

Alternatively, and referring to FIG. 15 of the drawings, the belt 18 may be formed from a series of hollow, channel-like members 60 that are interlinked with one another by means of pins 62. The shape of each channel-like member 60 is generally that of a truncated pyramid. Respective linking pins 62 extend laterally through the adjacent (i.e. opposing) ends of each successive pair of belt members 60 to form a joint therebetween around which the members may pivot when the belt 18 rotates around the core of the contact bar.

Figure 16:
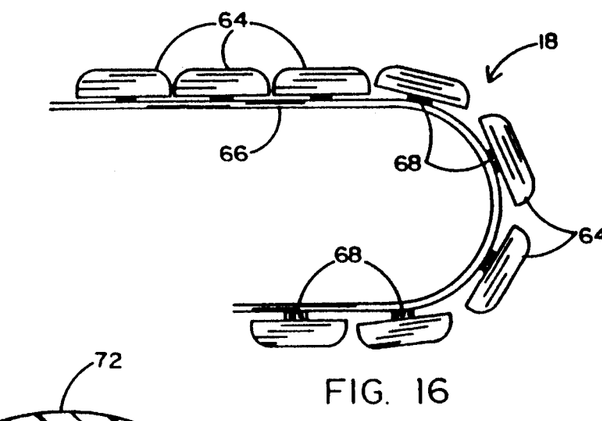

In FIG. 16, the belts 18 are formed from a continuously extending series of finger-sized segments or pads 64 that are affixed to and supported by a flexible strip 66. By way of example, the flexible strip 66 may be a thin layer formed from a material such as that known as Mylar, Teflon, or the like. Each pad 64 may be attached to its strip 66 by means of a suitable adhesive bond 68. A force applied by the computer operator to the pads 64 is transferred to the strip 66 thereunder for causing the strip to slide and the belt 18 to rotate in a longitudinal direction around the core of the contact bar.

Figure 17:
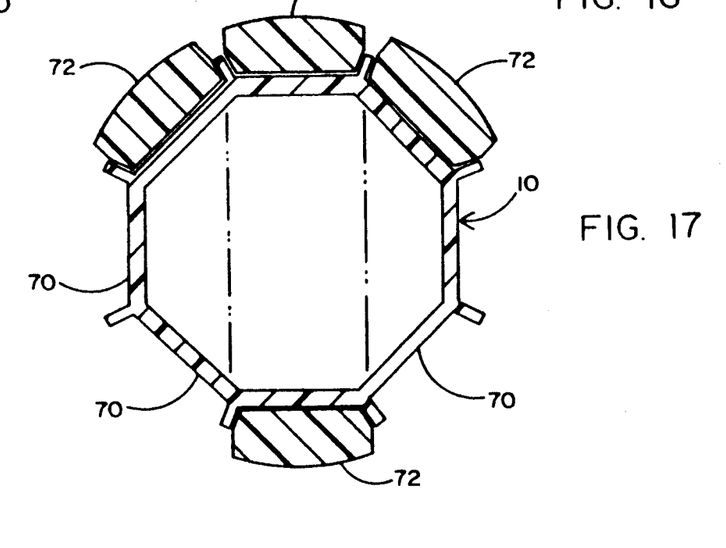
FIGS. 17-18 are illustrative of alternate embodiments for the contact bar and the belts carried thereby.

FIG. 17 of the drawings shows an alternate embodiment for both the contact bar 10 and the belts 18 which are carried thereby. That is, instead of being cylindrical, as previously disclosed, the core of the contact bar 10 may have a polygonal cross section. A plurality of eight evenly spaced and parallel aligned channels 70 extend longitudinally along the bar 10 for receipt of respective belts 72. The channels 70 prevent the belts 72 from sliding laterally relative to one another and establish longitudinal guide paths through which the belts may efficiently and easily slide when being rotated, by the computer operator, around the core of bar 10.

Figure 18:
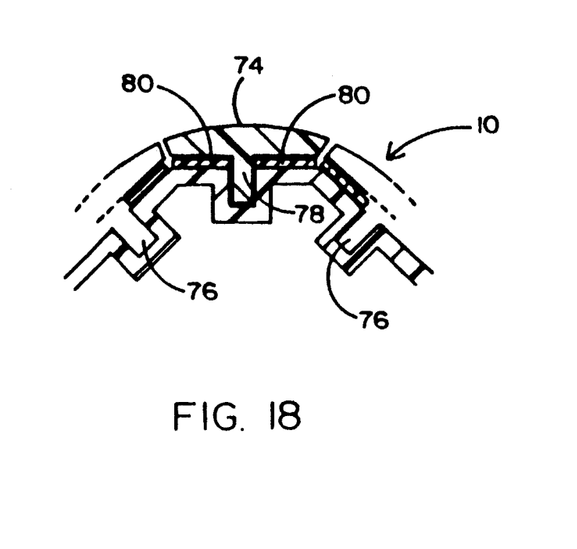
Figure 19:
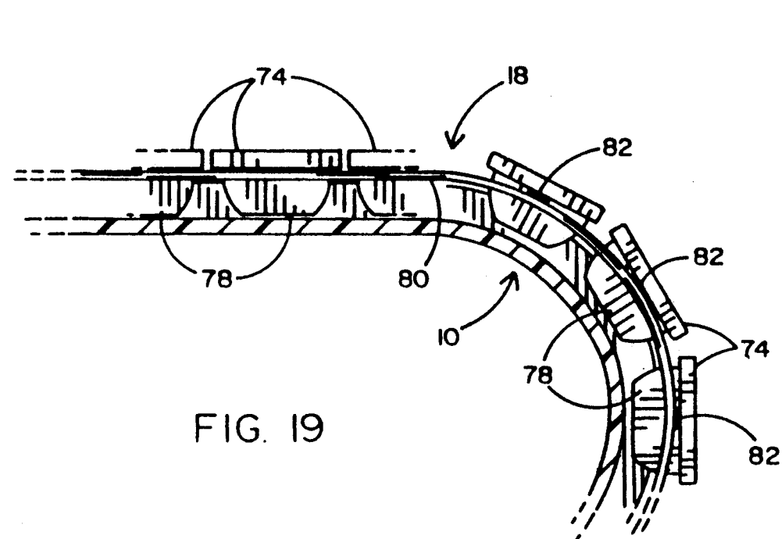
Figure 20:
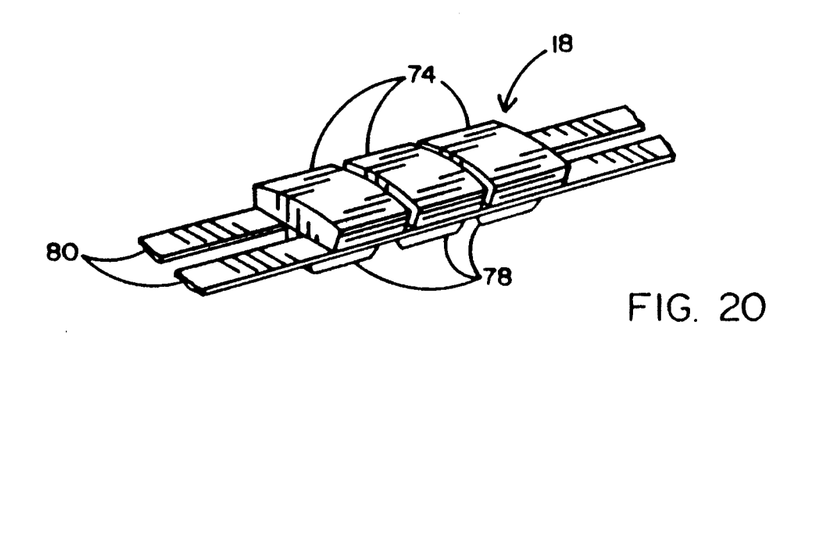

FIGS. 18-20 are illustrative of another contact bar 10 having a core of polygonal cross section for carrying four longitudinally extending belts 18 for rotation. However, instead of the channels of FIG. 17, the bar 10 of FIGS. 18-20 is provided with a plurality of evenly spaced and parallel aligned slots 76 which extend longitudinally along the bar 10 for receipt of respective belts 18. More particularly, each belt 18 is formed from a series of generally T-shaped segments 74 having a relatively wide top pad and a relatively narrow bottom fin 78. Each belt 18 is secured to and slidable with a pair of relatively thin, flexible and continuously extending strips 80 by means of an adhesive bond 82. The pair of strips 80 are located below the top pad and at opposite sides of the bottom fin 78 of a belt segment 74. By way of example, the strips 80 may be formed from a suitable low friction material, such as Mylar or Teflon. The slots 76 in bar 10 form tracks for receiving the fins 78 of belt segments 74 and thereby guiding a belt 18 therealong. That is, a force applied by the computer operator to the top segment 74 of any belt 18 is transferred to the pair of strips 80 for causing the fins 78 to slide through slots 76 and said belt to rotate around the core of contact bar 10.

Although the cores of the contact bars 10 of FIGS. 17-20 are of polygonal cross section, the shapes of the belts which travel thereover can be rounded at their top or outer surfaces to provide the bar 10 with a cylindrical feel and appearance. Such a cylindrical appearance may establish a more comfortable contact surface at which the computer operator engages and rotates the contact bar 10 and/or the belts thereof.

It will be apparent that while a preferred embodiment of the invention has been shown and described, various modifications and changes may be made without departing from the true spirit and scope of the invention. For example, although a total of four belts are shown and described as being carried for rotation by the contact bar 10, it is to be understood that any number of belts, having the same or different size relative to one another, may be carried by the bar 10 to increase the reliability by which the computer operator tactilely locates and rotates the bar relative to the computer keyboard and the belts relative to the bar. Moreover, the presently described input control system can also be used to simultaneously apply two input signals to electronic systems other than a computer, such as, but not limited to video equipment, automotive and avionic instrumentation, electronic instruments, including musical instruments, and the like. What is even more, the input control system could also be implemented as a stand alone system so as to be coupled or attached to a regular keyboard, laptop computer or electronic system to supply input signals thereto.

Also, the number of the wires 58 shown in FIG. 13 or the number of the flexible strips 66 and 80 shown in FIG. 16, 19 and 20 may be increased, or reduced, as in the case of FIG. 20. Also, the flexible strips 66 (or 80) may be molded in a single piece with the pads 64 (or 74) at fabrication level by means of injected plastic techniques or other fabrication process common to the art.

The sensing devices 25 and 26 may be replaced by any other movement sensing means which are known in the art. For example, optical sensors may be used to read patterns impressed directly on the surface of the belts 18 and/or at the core 12 of the bar 10. This will reduce mechanical moving parts, improving reliability and precision of the system. The individual sensing devices may use dissimilar technologies to detect movement of the bar 10 and belts 18. For example, sensing device 25 may use a mechanical sensing technology while sensing device 26 may use optical sensing technology to sense movement. The wheels 32 and 34 may have a geared surface, with teeth as in a regular mechanical gear system, coupling to a match gear surface at the end of the core 12 of the bar 10 for the wheel 32, or a geared surface on the belts 18 that couples to the wheel 34. In the case of the wheel 34, the gear geometry should be done in such a way that allows freedom of movement for axial rotation of the bar 10, but couples the wheel 34 to the corresponding belt 18 when the belts are rotated longitudinally on the bar 10. The sensing devices 25 and 26 shown on FIG. 3 may be mounted in any position relative to the bar 10 that allows equivalent sensing of the axial rotation of the bar 10 and longitudinal rotation of the belts 18 on the bar 10. For example, the rotational sensor 42 may be mounted in front of the bar 10, between the bar and the computer operator. Also, the wheel 32 of the sensing device 25 may be mounted with its axis, the axis of rod 36, and the axis of sensor 40 all parallel to the axis of the bar 10, with the wheel 32 touching the belts 18 in a similar way that the wheel 34 touches the belts 18 in FIG. 3.

The bar 10 may be installed at a different position on the keyboard 8. For example, the bar size may be reduced to the dimensions of a regular spacebar for a keyboard and installed at its position thereby replacing the keyboard spacebar. This system will perform the dual functions of spacebar and tactile input system at a single contact area. The bar 10 may also be mounted on the top portion of the keyboard 8, between the keyboard keys and the computer monitor.

Having thus set forth a preferred embodiment of the invention, what is claimed is:

1. A bidimensional input system for providing input signals for controlling a utilization device, said input system comprising:
   a support surface having a longitudinally extending axis around which said support surface is endlessly rotatable in a first direction;
   movable means carried by said support surface and adapted for endless rotation with said support surface in said first direction and adapted for endless rotation relative to said support surface in a second direction, the rotation of said movable means in said first and second directions being independent of one another;
   motion responsive means to detect the rotation of said movable means in said first and second directions; and
   signal generating means interfaced with said motion responsive means to generate first and second input signals to the utilization device, said first and second input signals corresponding, respectively, to the rotation of said movable means in said first and second directions detected by said motion responsive means.

2. The bidimensional input system recited in claim 1, wherein said first and second directions in which said movable means is rotatable are orthogonally aligned relative to one another and correspond to the two dimensions of said bidimensional input system.

3. The bidimensional input system recited in claim 1, wherein said movable means includes a plurality of rotatable belts which are carried by and spaced from one another around the periphery of said support surface in parallel alignment with the longitudinal axis thereof, each of said belts extending completely around said support surface and through the opposite ends thereof.

4. The bidimensional input system recited in claim 1, wherein said movable means includes at least one continuous loop that is carried by said support surface and rotatable around said support surface in a direction parallel to the longitudinal axis thereof.

5. The bidimensional input system recited in claim 3, wherein each of said plurality of belts extends through the opposite ends of said support surface at a different location of said surface, such that said belts have respective rotational paths around said support surface which do not intersect one another.

6. The bidimensional input system recited in claim 5, further comprising a series of rollers located between each of said plurality of belts and said support surface to reduce friction therebetween when one or more of said belts slides longitudinally along and thereby rotates around said surface.

7. The bidimensional input system recited in claim 5, wherein each of said belts is formed from a series of segments linked together by flexible linking means.

8. The bidimensional input system recited in claim 5, wherein each of said belts is formed from a series of segments pivotally interconnected with one another.

9. The bidimensional input system recited in claim 5, wherein each of said belts is formed from a series of pads and a flexible strip to which said pads are affixed, such that an axial force applied to at least one of said pads causes a corresponding movement of said strip along said support surface.

10. The bidimensional input system recited in claim 5, wherein said support surface includes a plurality of longitudinally extending and parallel aligned channels located thereon, each channel receiving therein and forming a guide path for a respective one of said plurality of belts.

11. The bidimensional input system recited in claim 5, wherein said support surface includes a plurality of longitudinally extending and parallel aligned tracks located thereon, and each of said belts includes a series of segments having a fin portion projecting from each segment, each track receiving therein the fin portions of the segments of a respective one of said plurality of belts for forming a guide path for said at least one belt.

12. The bidimensional input system recited in claim 5, wherein said motion responsive means includes at least one motion sensor positioned relative to said support surface so as to detect the direction in which said support surface rotates around its longitudinal axis and the rotational distance traveled thereby.

13. The bidimensional input system recited in claim 5, wherein said motion responsive means includes at least one motion sensor positioned relative to at least one of said plurality of belts so as to detect the direction in which said belt is rotated around said support surface and the rotational distance traveled by said belt.

14. The dimensional input system recited in claim 5, wherein said utilization device is a computer having a monitor and a keyboard, said support surface to be mounted for rotation at the keyboard for controlling the operation of the computer.

15. The bidimensional input system recited in claim 14, wherein a rotation of said support surface around its axis causes a corresponding movement of the computer cursor on the computer monitor, and a rotation of at least one of said plurality of belts around said support surface causes a corresponding movement of the cursor on the monitor.

16. A bidirectional input system for providing at least first and second input signals to a computer for controlling the operation thereof, said input system comprising:
   support surface means having a longitudinally extending axis and being rotatable around said axis in a first direction;
   means carried by and movable longitudinally along said support surface means in a second direction, said movable means including a plurality of rotatable belts which are spaced from and slidable longitudinally thereover in said second direction, each of said belts extending completely around said support surface means and through the opposite ends thereof;
   motion responsive means being responsive to the rotation of said support surface means around its axis and the movement of said belts along said support surface means; and
   signal generating means interfaced with said motion responsive means to generate said first and second input signals to the computer, said first input signal being dependent upon the rotational distance traveled and the direction in which said support surface means is rotated around its axis, and said second input signal being dependent upon the distance traveled and the direction in which at least one of said plurality of belts slides along said support surface means.

17. The bidirectional input system recited in claim 16, wherein the computer has a keyboard, said support surface means to be mounted for rotation at the keyboard.

18. The bidirectional input system recited in claim 16, wherein each of said plurality of belts extends through the opposite ends of said support surface means at a different location, such that said belts have respective rotational paths around said support surface means which do not intersect one another.

19. A bidimensional input system for providing input signals to a microprocessor controlled device for controlling the operation thereof; said input system comprising:
   a support surface having a longitudinally axis and being endlessly rotatable around said axis in a first direction;
   movable means carried by said support surface and adapted for endless longitudinal movement relative to said support surface means in a second direction, the rotation of said support surface means and the longitudinal movement of said movable means being independent of one another;
   motion responsive means being responsive to the rotation of said support surface means around its axis and the longitudinal movement of said movable means relative to said support surface means; and signal generating means interfaced with said motion responsive means to generate first and second input signals to the microprocessor controlled device, and first input signal being dependent upon the rotational distance traveled and the direction in which said support surface means is rotated around its axis, and said second input signal being dependent upon the distance traveled and the direction in which said movable means moves relative to said support surface means.

20. The bidirectional input system recited in claim 19, wherein said movable means includes at least one continuous loop that is rotatable through a continuous loop path around said support surface means and slidable longitudinally along said support surface means in said second direction which is parallel to the longitudinal axis of said support surface means.

21. The bidirectional input system recited in claim 19, wherein said movable means includes a plurality of belts that are spaced from one another around the periphery of said support surface means and rotatable therearound and slidable longitudinally therealong in said second direction which is parallel to the longitudinal axis of said support surface means.

22. A bidirectional input system for controlling the position of a positionable utilization means, said input system comprising:

first movable means having an axis around which to rotate in a first direction, said first movable means having opposite ends and a slot formed through each of said ends;

second movable means extending through the slots formed in said first movable means so as to be rotatable around said first movable means in a second direction;

motion responsive means to detect the rotation of said first and second movable means in said first and second directions; and signal generating means interfaced with said motion responsive means to generate input signals to control the position of the utilization means corresponding to the rotation detected by said motion responsive means of said first and second movable means in said first and second directions, the position of the utilization means being dependent upon the input signals generated by said signal generating means.

23. The bidirectional input system recited in claim 22, wherein said first and second directions in which said first and second movable means are rotated are orthogonally aligned relative to one another.

24. The bidirectional input system recited in claim 22, wherein said first movable means has a longitudinally extending axis around which said first movable means is rotated in said first direction, said second movable means being rotated around loop path which extends in said second direction and in parallel alignment with said longitudinally extending axis of said first movable means.

25. The bidirectional input system recited in claim 22, wherein said first movable means includes a support surface having a longitudinally extending axis around which said support surface is rotated in said first direction, and said second movable means includes at least one unending loop carried by and extending around said support surface in a continuous loop path, said loop being rotated through said continuous loop path corresponding to said second direction which is parallel to the longitudinally extending axis of said support surface.

26. The bidirectional input system recited in claim 25, wherein said at least one continuous loop comprises a plurality of belts that are spaced from one another around the periphery of said support surface in a continuous loop path and being rotatable in said second direction.

27. A bidimensional system for providing input signals for controlling a utilization device, said input system comprising:

a support surface having a longitudinally extending axis around which said support surface is endlessly rotatable;

movable means carried by said support surface and adapted for endless rotation relative to said support surface through a continuous loop path which extends around said support surface in a direction parallel to the longitudinally extending axis thereof, such that the rotation of said movable means is independent of the rotation of said support surface;

motion responsive means to detect the rotational movement of said support surface and said movable means; and signal generating means interfaced with said motion responsive means to generate first and second input signals to the utilization device, said first and second input signals corresponding, respectively, to the movement of said support surface and said movable means detected by said motion responsive means.

* * * * *